Patented Nov. 13, 1951

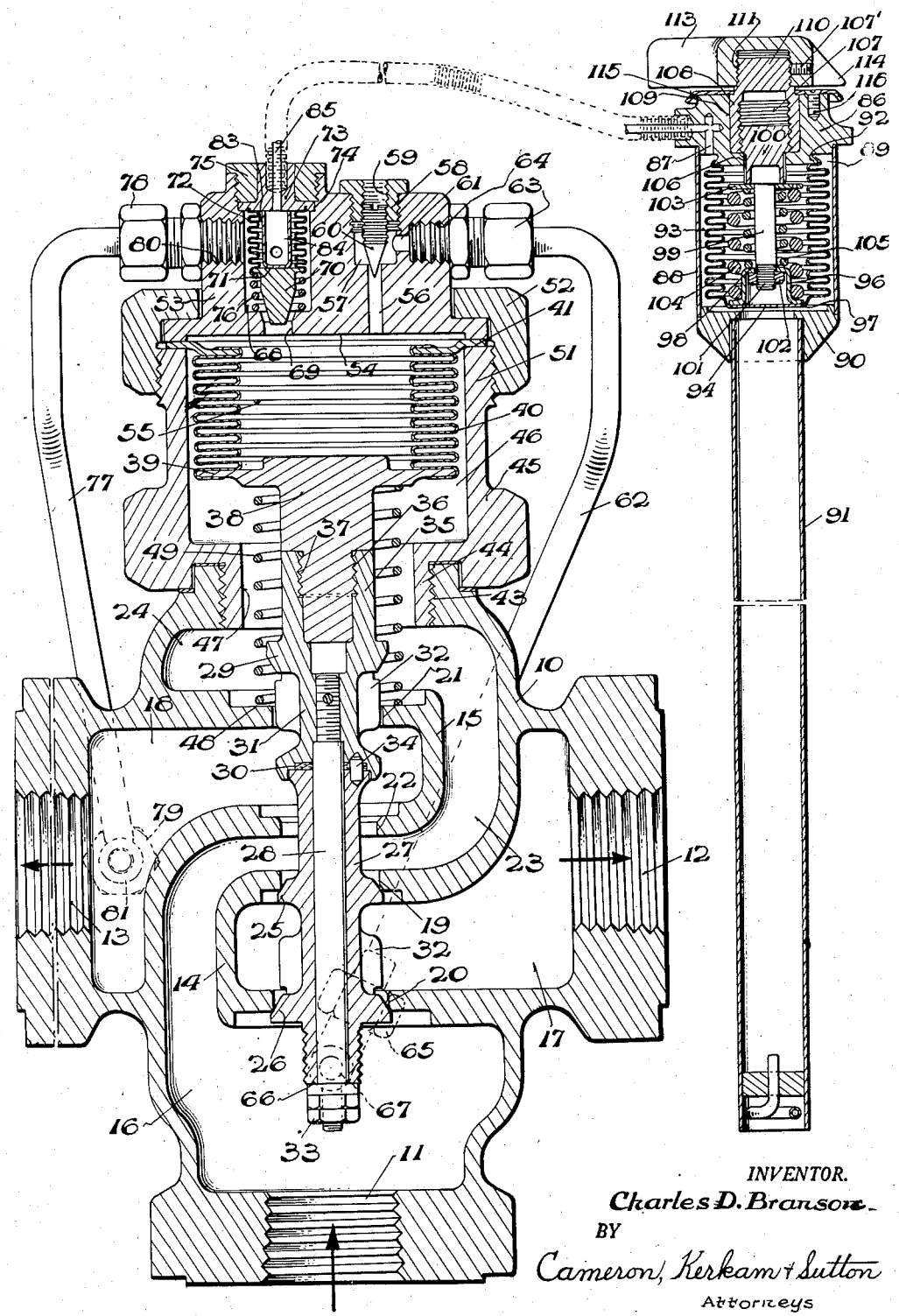

2,575,042

UNITED STATES PATENT OFFICE 2,575,042

PILOT OPERATED VALVE MECHANISM

Charles D. Branson, Knoxville, Tenn., assignor to Robertshaw-Fulton Controls Company, Knoxville, Tenn., a corporation of Delaware Application July 26, 1948, Serial No. 40,693

7 Claims. (Cl. 236—80)

This invention relates to a pilot operated valve mechanism and, more particularly, to a pilot operated valve mechanism for closely proportioning the flow of fluid between a supply conduit and a by-pass conduit so as to maintain a closely regulated pressure or a closely controlled volume flow in the supply conduit.

In air conditioning systems wherein the heating or cooling medium is circulated through suitable heat exchangers it is usual to modulate the flow of the medium in conformity with the temperature requirements of the space to be heated or cooled. If the medium flow is controlled by a valve operated directly from a thermostat that is subjected to the temperature of the space being heated or cooled, experience has demonstrated that it is extremely difficult if possible to maintain the temperature within a narrow range because of the unavoidable lag in the response of the thermostat to temperature changes both in responding to a requirement for increased flow of the heating or cooling medium and thereafter in decreasing medium flow after the desired temperature has been attained. On the other hand, if the flow of medium through the heat exchanger is controlled by a pressure operated valve responding to the pressure drop across the heat exchanger, and if the pressure of the medium flowing to the heat exchanger can be closely modulated in conformity with the temperature requirements of the space whose temperature is to be controller, the medium flow through the heat exchanger can be regulated so as to maintain the temperature within a relatively narrow range, say on the order of 3° F., as compared with the 12 to 18° F. that may exist where the medium flow is controlled by a valve directly operated by a thermostat subjected to the temperature of said space.

It is an object of this invention to provide an improved valve mechanism whereby the pressure of the medium flowing through the supply conduit to the space heaters or coolers may be closely modulated within a relatively narrow range so as to overcome the foregoing difficulties encountered when using a thermostat directly connected to a valve mechanism for controlling medium flow.

Another object of this invention is to provide an improved valve mechanism for predetermining the flow of medium between a supply conduit and a by-pass conduit so as to regulate closely the volume or the pressure of the medium flowing through the supply conduit.

Another object of this invention is to provide an improved pilot valve mechanism of the type characterized which is simple in construction, compact so that it may be readily installed as a unit, relatively inexpensive to fabricate so that it can be produced economically, and yet one that is highly efficient in closely modulating the fluid flow through the supply conduit.

Other objects will appear as the description of the invention proceeds.

The invention is capable of receiving a variety of mechanical expressions, only one of which has been shown on the accompanying drawing, and therefore it is to be expressly understood that the drawing is for purposes of illustration only, and is not to be construed as a definition of the limits of the invention, reference being had to the appended claims for that purpose.

The invention is equally susceptible of embodiment in valve mechanism for controlling the flow of a heating medium or a cooling medium. As illustrated on the accompanying drawing, the invention is embodied in a valve mechanism for controlling the flow of a cooling medium wherein an increase of temperature calls for an increased flow of cooling medium. As in controlling a heating medium increase of temperature calls for a decrease in the flow of the heating medium, it will be apparent to those skilled in the art that the thermostatic control must be reversed in a valve mechanism for controlling the flow of a heating medium, but otherwise the valve mechanism in construction and operation would be the same as now to be described with respect to its illustrated application to the control of a cooling medium.

The drawing shows a sectional elevation of an embodiment of the invention appropriate for controlling the flow of a cooling medium.

As illustrated, the valve mechanism includes a valve housing 10 of any suitable size, construction and material provided with an inlet 11 for the medium to be controlled and outlets 12 and 13 for connection to suitable supply and by-pass conduits respectively. As illustrated, the inlet opening 11 and the outlet openings 12 and 13 are threaded to receive suitable piping, it being understood that the supply conduit communicating with the outlet opening 12 may lead to any suitable heat exchanger, which may be provided with any suitable pressure operated valve mechanism or other appropriate valve mechanism for controlling the medium flow, or if preferred the valve to be described may be used as the volume control for the circulated medium.

Interiorly said housing 10 is provided with suitable webs 14 and 15 so as to subdivide the space within said housing into an inlet chamber 16, an outlet chamber 17 in communication with the outlet 12 and an outlet chamber 18 in communication with the outlet 13. Web 14 is provided with a pair of aligned valve ports 19 and 20, here shown as apertures formed in the webs, but suitable valve seat members may be associated with said ports if preferred. Similarly, web 15 is provided with a pair of aligned valve ports 21 and 22 in alignment with valve ports 19 and 20, valve ports 21 and 22 being shown as apertures in said web but suitable valve seat members may be used if preferred. Webs 14 and 15 are spaced so as to provide a passage 23 through which the medium may flow from the inlet chamber 16 to the ports 19 and 22 and also to the port 21, said passage preferably being so constructed as to provide a predetermined drop of pressure between the inlet chamber 16 and the chamber 24 with which the port 21 communicates, one or more constrictions being introduced into said passage if desired so as to obtain the desired pressure drop at the chamber 24.

Cooperating with the valve ports 19 and 20 are a pair of valve members 25 and 26, here shown as formed unitarily with a sleeve 27 mounted on a rod 28, although the supply valve mechanism constituted by said valve members 25 and 26 may include valve members of any other suitable construction. Mounted for cooperation with the valve ports 21 and 22 is a second pair of valve members 29 and 30 also shown as formed unitarily with a sleeve 31, although any other suitable form of valve member may be used. As illustrated, sleeves 27 and 31 carry one or more fins 32 for cooperation with slots in the periphery of the valve ports 20 an 21 so as to prevent rotation of the valve mechanism relative to said ports. Sleeve 27 is held in engagement with sleeve 31 by nuts 33 mounted on the end of the rod 28, and if desired a dowel pin 34 may be introduced between said two sleeves to prevent relative rotation. The upper end of the rod 28 as shown in the drawing may be pinned or otherwise suitably attached to the sleeve 31 so that the four valve members 29, 30 and 25, 26 will move as a unit, the valve members 29 and 30, constituting the by-pass valve mechanism, cooperating with the valve ports 21 and 22, and the valve members 25 and 26, constituting the supply valve mechanism, cooperating with the valve ports 19 and 20.

Sleeve 31 has formed thereon or suitably attached thereto a tubular extension 35 having an interiorly threaded bore at 36 by which it is attached to a threaded extension 37 on a block 38, here shown as flanged at 39 for the attachment thereto of an expansible and collapsible corrugated tubular wall or bellows 40. The opposite end of the bellows 40 is sealed to an annular member 41 by which the bellows is mounted in position.

Valve housing 10 has a threaded aperture 43 in alignment with the valve ports heretofore described and mounted in said aperture 43 is the threaded hub 44 of a housing extension member 45 providing an interior chamber 46 within which is disposed the bellows 40. Chamber 46 is in communication with the chamber 24 heretofore referred to through the open bore 47 of hub 44, although the passage 47 may be constricted if desired to obtain the desired pressure drop in the chamber 46 in conformity with the explanation hereinafter given. As illustrated, the web 15 around the port 21 is recessed at 48 to provide a spring seat, and interposed between said spring seat and the flanged block 38 is a coil spring 49 which acts to bias the by-pass valve mechanism to wide open position with consequent closing of the supply valve mechanism. However, if the pressure in the chamber 46 is not sufficiently low in conformity with the principle of operation hereinafter described, a coil spring may be installed to operate in the opposite direction, within the bellows 40 if desired, so as to maintain a predetermined differential of pressure in conformity with the explanation hereinafter given.

Housing extension member 45 is threaded at its upper extremity 51 as viewed in the drawing and secured to said housing extension member 45 by a ring nut 52 is a block 53 which cooperates with the the extremity of the housing extension member 45 to clamp annular member 41 between said block 53 and the end of said housing extension member. Thereby the bellows 40, together with the flanged block 38, which constitutes a movable end wall, and said block 53, provides an expansible and collapsible chamber 55 the movable end wall of which is positively connected to the by-pass valve mechanism and the supply valve mechanism hereinbefore described.

Block 53 has a passage 56 extending from its under face as viewed in the drawing to a chamber 57 closed at its outer end by a threaded thimble 58 having an interiorly threaded bore 59 in which is mounted an adjustable needle valve 60 for predetermining the effective area of the passage 56. Also communicating with the chamber 57 is a second passage 61 that is in communication with a passage leading to the inlet chamber 16. As illustrated, a conduit 62 is provided with a suitable coupling 63 by which one end of said conduit is secured in a threaded recess 64 opening into the passage 61 and the opposite end of conduit 62 is provided with a suitable coupling 65 by which the end of the conduit 62 is similarly mounted in a recess 66 in the wall of the valve housing 10, recess 66 opening into an aperture 67 leading through the wall of the valve housing 10 into inlet chamber 16, so that the latter is in open communication through aperture 67, conduit 62, passage 61, the chamber 57 and passage 56 with the expansible and collapsible chamber 55.

Block 53 is provided with a second chamber 68 from which leads a pilot valve port 69 that also communicates with the expansible and collapsible chamber 55. Mounted in said chamber 68 for cooperation with said pilot valve port 69 is a pilot valve mechanism, here shown as a member 70 formed on or suitably connected to the movable end wall 71 of an expansible and collapsible chamber 83 whose periphery is formed by an expansible and collapsible corrugated tubular wall or bellows 72 carried in any suitable way at its opposite or stationary end by a flanged block 73 secured in a recess 74, at the outlet end of chamber 68, by a threaded thimble 75. A coil spring 76 is interposed between the end wall of the chamber 68 and said movable end wall 71 and normally urges the pilot valve member 70 toward its open position. A stop 84 is preferably mounted on the block 73 within the chamber 83 to limit the extent to which said chamber can be collapsed by the spring 71. Also in communication with said chamber 68 is a passage leading to the by-pass, here shown as a conduit 77 which leads from said chamber 68 to outlet chamber 18, suitable couplings 78 and 79 being provided for securing the ends of said conduit in threaded recesses 80 and 81 in block 53 and the wall of the valve housing 10, respectively.

The expansible and collapsible chamber 83 constitutes the motor vessel of the thermostat next to be described whereby the pilot valve member 70 may be moved against the tension of the spring 76 toward closed position upon increase in pressure within said chamber 83, a decrease of pressure in said chamber 83 resulting in a movement of pilot valve member 70 toward open position under the action of spring 76. Communicating with chamber 83 is a conduit 85 of any suitable size, length and construction, but preferably flexible in form, said conduit at its opposite end being suitably connected to a block 86 in which is a passage 87 in communication with said conduit 85. Suitably secured to said block 86 is a tubular housing member 88 providing a chamber 89 with which said passage 87 commmunicates. The opposite end of housing member 88 is attached in any suitable way to an annular member 90 in which is secured the open end of a tubular bulb 91 of any suitable size, length and construction.

Block 86 is provided with a flange 92 to which is hermetically sealed one end of an expansible and collapsible corrugated tubular wall or bellows 93 which, at its opposite end, is connected to a movable end wall 94 integral therewith or suitably attached thereto. Bellows 93 in conjunction with the tubular housing member 88 renders the chamber 89 heretofore referred to an expansible and collapsible chamber which at one end is in communication with the bulb 91 and at its other end is in communication through the passage 87 with the conduit 85 leading to the chamber 83. Bulb 91, chamber 89, conduit 85 and chamber 83 are charged with any suitable thermosensitive fluid so as to provide a thermostat whereby increases and decreases of temperature at bulb 91 will effect an expansion and contraction of the chamber 83 connected to the pilot valve member 70. Bulb 91 may be disposed in any suitable relationship to the valve housing 10 and its associated parts so as to be properly responsive to the temperature of the space whose temperature is to be controlled.

Mechanism is preferably associated with the bellows 93 for expanding and contracting the latter so as to vary the internal volume of the chamber 89 and thereby the pressure in the chamber 83. As illustrated, an inverted cup-shaped wall 96 has a flanged extremity 97 in engagement with the movable end wall 94 of the bellows 93. The bottom wall of cup-shaped member 96 is apertured at 98 and slidably mounted on a post 99 carried by an exteriorly threaded block 100. The inner extremity of post 99 is threaded at 101 and carries a nut 102. Mounted on the post 99 in engagement with the inner extremity of the block 100 is a plate 103 between which the flanged extremity 97 of member 96 extends a coil spring 104. A second coil spring 105 extends between the bottom wall of said cup-shaped member 96 and said plate 103 and normally holds the bottom wall of said member 96 against the nut 102. However, spring 105 may yield and permit cup-shaped member 96 to slide upwardly on post 99 as viewed in the drawing if excessive pressure develops in the chamber 89 after pilot valve member 70 engages its seat.

Block 100 is held against rotation by suitable splines 106, and its exterior threads cooperate with the interior threads 107 in the bore of a tubular member 108 mounted rotationally in a chamber 109 in the block 86. The outer end of tubular member 108 is provided with a post 110 to which is secured in any suitable way, as by threads 111 and set screw 112, a manually operable adjusting member 113 which may be provided with a pointer 114 for cooperation with any suitable indicia on a scale plate 115 suitably secured to the block 86 as by one or more screws 116. Rotation of member 113 rotates tubular member 108, and by reason of its threaded connection with block 100, said block may move inwardly or outwardly with respect to the chamber interiorly of the bellows 93, block 100 being held from rotation during such movement by the splines 106. Thereby block 100 may transmit or release pressure through spring 104 to or from the movable end wall 94 of chamber 89 to respectively decrease or increase the internal volume of the chamber 89 and thereby vary the pressure at the chamber 83. Therefore, by adjusting the manually operable member 113 the pilot valve member 70 may be made to approach or recede with respect to its seat and thereby predetermine the amount of expansion required at bulb 91 in order to effect closure of the pilot valve member 70. If the pressure in bulb 91 should continue to increase after pilot valve member 70 has engaged its seat said pressure will collapse the bellows 93, cup-shaped member 96 sliding on post 99 against the tension of spring 105 until the excess pressure is released, whereupon spring 105 will restore cup-shaped member 96 into cooperative relationship with the nut 102 on the end of the post 99.

The medium to be controlled, here assumed to be a cooling medium flows into inlet chamber 16 through the inlet 11 and in conformity with the principle of the present invention the pressure in the supply conduit in communication with the outlet 12 is predetermined by the extent to which the inflowing medium is returned to its source through the by-pass in communication with the outlet 13. As illustrated, the compound by-pass and supply valve mechanism is biased by the spring 49 so that the by-pass valve mechanism is normally wide open and the supply valve mechanism is completely closed. The pressure in the inlet chamber 16 is transmitted through the conduit 62 to the chamber 55, the rate at which pressure can be built up in said chamber 55 being predetermined by the position of the needle valve 60 with respect to the passage 56. The pressure in chamber 46 exteriorly of the chamber 55 is normally less than the pressure in said chamber 55 because, as before explained, said chamber 46 is in open communication with chamber 24 and as the capacity of the by-pass valve mechanism when open is greater than the capacity of the passage 23 owing to the restrictions afforded by the webs defining said passage 23, with or without additional constrictions as required, the pressure in chamber 24 is predeterminately less than the pressure in the inlet chamber 16. In other words, when the inlet pressure is applied to the chamber 55 there is a differential pressure between the interior and exterior of said chamber 55 which is sufficient to overcome the tension of the spring 49 and move the by-pass valve mechanism toward closed position with a corresponding opening of the supply valve mechanism. But the full pressure in the inlet chamber 16 can be applied to chamber 55 only when pilot valve member 70 closes the port 69. When pilot valve member 70 opens the port 69 the pressure in chamber 55 is released through conduit 77 to the outlet chamber 18 and chamber 55 is contracted by spring 49 to move the by-pass valve mechanism toward open position with a corresponding closing movement of the supply valve mechanism. Therefore, the pressure in said chamber 55 can be closely controlled by the position of the pilot valve member 70 with respect to its port 69.

Pilot valve member 70 is under the control of the thermostat comprising bulb 91, conduit 85 and chamber 83, and therefore the position of the pilot valve member with respect to its port can be closely and sensitively regulated to conform with the temperature at the bulb 91. Thereby the compound by-pass and supply valve mechanism can be closely adjusted to so proportion the flow of fluid through the supply conduit and the by-pass conduit that the desired pressure or volume flow may be maintained in the supply conduit to meet the needs of the heat exchanger for the particular temperature at the bulb 91. The temperature to be maintained may be nicely adjusted by operating the manually operable member 113 to predetermine the location of the pilot valve member 70 with respect to its port so as to predetermine what temperature change at the bulb 91 will be effective in initiating operation of the pilot valve member 70. Experience has demonstrated that with such a pilot valve control of the prorationing of the flow between the supply and by-pass conduits the temperature at the bulb 91 may be kept within relatively narrow limits, on the order of 3° F., thereby avoiding the much greater temperature variations heretofore obtained when the medium flow is controlled by a valve that is operated directly by a thermostat.

It will therefore be perceived that the present invention provides an improved pilot operated valve mechanism for prorationing the flow of circulated medium between a supply and a by-pass conduit which enables a highly sensitive response to the temperature of the space to be controlled whereby said temperature is kept within a much narrower range than possible when the medium flow is controlled by a valve operated directly by a thermostat. At the same time the improved valve mechanism of this invention can be readily built into a compact unit that may be conveniently installed at points relatively remote from the point at which the bulb is to be installed for subjection to the temperature of the space to be controlled. Furthermore, the improved valve mechanism is of a relatively simple construction, being composed of parts that are inexpensive to manufacture and assemble, so that it may be economically produced. The improved valve mechanism is also highly efficient because of its sensitive response to temperature variations at the bulb in prorationing the medium flow between the supply and by-pass conduits.

While the embodiment of the invention illustrated on the drawing has been described with considerable particularity, it is to be expressly understood that the invention is not limited thereto as the same is capable of receiving a variety of mechanical expressions, some of which will now readily suggest themselves to those skilled in the art, while changes may be made in the details of construction, arrangement, proportion, size, etc., and parts illustrated may be replaced by equivalent parts, without departing from the spirit of this invention. While the illustrated embodiment is constructed to control the flow of a cooling medium, it will be apparent to those skilled in the art that by reversing the action of the thermostat it is equally applicable to the control of a heating medium. Also, while the invention has been described with particular reference to its use in conjunction with pressure controlled valves for controlling a heat exchanger it will be apparent that the invention is of wider application where closely controlled pressure or volume in a supply conduit is desired. Reference is therefore to be had to the appended claims for a definition of the invention.

What is claimed is:

1. In a pilot operated valve mechanism for prorationing the flow between supply and by-pass conduits, the combination of a valve housing having interior webs providing an inlet chamber, a supply conduit outlet chamber and a by-pass outlet chamber, said interior webs having ports between the inlet chamber and the supply conduit outlet chamber and between the inlet chamber and the by-pass outlet chamber, supply and by-pass valve mechanism respectively cooperating with said ports and operatively connected to move as a unit, an expansible and collapsible chamber operatively connected to said valve mechanism, means providing a passage communicating with said inlet chamber and said expansible and collapsible chamber, means providing a chamber in communication with said inlet chamber whereby the exterior of said expansible and collapsible chamber is subjected to a pressure less than the pressure in the inlet chamber, means providing a passage between said expansible and collapsible chamber and said by-pass outlet chamber, and a pilot valve mechanism associated with said last named passage for controlling the pressure in said expansible and collapsible chamber.

2. In a pilot operated valve mechanism for prorationing the flow between supply and by-pass conduits, the combination of a valve housing having interior webs providing an inlet chamber, a supply conduit outlet chamber and a by-pass outlet chamber, said interior webs having ports between the inlet chamber and the supply conduit outlet chamber and between the inlet chamber and the by-pass outlet chamber, supply and by-pass valve mechanisms respectively cooperating with said ports and operatively connected to move as a unit, an expansible and collapsible chamber operatively connected to said valve mechanism, means providing a passage communicating with said inlet chamber and said expansible and collapsible chamber, means providing a chamber in communication with said inlet chamber whereby the exterior of said expansible and collapsible chamber is subjected to a pressure less than the pressure in the inlet chamber, means providing a passage between said expansible and collapsible chamber and said by-pass outlet chamber, a pilot valve mechanism associated with said last named passage for determining when the pressure in said expansible and collapsible chamber shall correspond with the pressure in said inlet chamber, said pilot valve mechanism including a valve member associated with the inlet of said last named passage, and a thermostat operatively connected to said pilot valve member.

3. In a pilot operated valve mechanism for prorationing the flow between supply and by-pass conduits, the combination of a valve housing having interior webs providing an inlet chamber, a supply conduit outlet chamber and a by-pass outlet chamber, said interior webs having ports between the inlet chamber and the supply conduit outlet chamber and between the inlet chamber and the by-pass outlet chamber, supply and by-pass valve mechanisms respectively cooperating with said ports and operatively connected to move as a unit, an expansible and collapsible chamber operatively connected to said valve mechanism, means forming an extension of said valve housing and providing a chamber in communication with said inlet chamber in which said expansible and collapsible chamber is disposed, means whereby the pressure in said last named chamber is maintained below that in said inlet chamber, means providing a passage between said inlet chamber and said expansible and collapsible chamber, means providing a passage between said expansible and collapsible chamber and said by-pass outlet chamber, and a pilot valve mechanism associated with said last named passage for controlling the pressure in said expansible and collapsible chamber.

4. In a pilot operated valve mechanism for prorationing the flow between supply and by-pass conduits, the combination of a valve housing having interior webs providing an inlet chamber, a supply conduit outlet chamber and a by-pass outlet chamber, said interior webs having ports between the inlet chamber and the supply conduit outlet chamber and between the inlet chamber and the by-pass outlet chamber, supply and by-pass valve mechanisms respectively cooperating with said ports and operatively connected to move as a unit, an expansible and collapsible chamber operatively connected to said valve mechanism, means forming an extension of said valve housing and providing a chamber in communication with said inlet chamber in which said expansible and collapsible chamber is disposed, means whereby the pressure in said last named chamber is maintained below that in said inlet chamber, means providing a passage between said inlet chamber and said expansible and collapsible chamber, means providing a passage between said expansible and collapsible chamber and said by-pass outlet chamber, a pilot valve mechanism associated with said last named passage for controlling the pressure in said expansible and collapsible chamber, and resilient means cooperating with said expansible and collapsible chamber to oppose expansion thereof until the pressure interiorly of said chamber predeterminedly exceeds the pressure in said extension chamber.

5. In a pilot valve mechanism for prorationing the flow between a supply conduit and a by-pass conduit, a valve housing provided with interior webs forming an inlet chamber, a supply conduit outlet chamber and a by-pass outlet chamber, said webs having ports between said inlet and supply conduit outlet chambers and between said inlet and by-pass outlet chambers, supply and by-pass valve mechanisms respectively associated with said ports and operatively connected together to move as a unit, an expansible and collapsible chamber operatively connected to said valve mechanism, said housing also including means providing a chamber in which said expansible and collapsible chamber is disposed, means connecting the interior of said last named chamber to the interior of said housing, said last named means being so constructed that the pressure in said last named chamber is below the pressure in said inlet chamber, resilient means associated with said expansible and collapsible chamber for urging said by-pass valve mechanism toward open position, means providing a passage between said inlet chamber and said expansible and collapsible chamber, means providing a passage between said expansible and collapsible chamber and said by-pass outlet chamber, and a thermostatically operated pilot valve mechanism associated with said last named passage for controlling the pressure in said expansible and collapsible chamber.

6. In a pilot valve mechanism for prorationing the flow between a supply conduit and a by-pass conduit, a valve housing provided with interior webs forming an inlet chamber, a supply conduit outlet chamber and a by-pass outlet chamber, said webs having ports between said inlet and supply conduit outlet chambers and between said inlet and by-pass outlet chambers, supply and by-pass valve mechanisms respectively associated with said ports and operatively connected together to move as a unit, an expansible and collapsible chamber operatively connected to said valve mechanism, said housing also including means providing a chamber in which said expansible and collapsible chamber is disposed, means connecting the interior of said last named chamber to the interior of said housing, said last named means being so constructed that the pressure in said last named chamber is below the pressure in said inlet chamber, resilient means associated with said expansible and collapsible chamber for urging said by-pass valve mechanism toward open position, means providing a passage between said inlet chamber and said expansible and collapsible chamber, means providing a passage between said expansible and collapsible chamber and said by-pass outlet chamber, a thermostatically operated pilot valve mechanism associated with said last named passage for controlling the pressure in said expansible and collapsible chamber, and means associated with said first named passage for predetermining the rate at which the pressure from said inlet chamber may build up in said expansible and collapsible chamber.

7. In a pilot valve mechanism for prorationing the flow between a supply conduit and a by-pass conduit, a valve housing provided with interior webs forming an inlet chamber, a supply conduit outlet chamber and a by-pass outlet chamber, said webs having ports between said inlet and supply conduit outlet chambers and between said inlet and by-pass outlet chambers, supply and by-pass valve mechanisms respectively associated with said ports and operatively connected together to move as a unit, an expansible and collapsible chamber operatively connected to said valve mechanism, said housing also including means providing a chamber in which said expansible and collapsible chamber is disposed, means connecting the interior of said last named chamber to the interior of said housing, said last named means being so constructed that the pressure in said last named chamber is below the pressure in said inlet chamber, resilient means associated with said expansible and collapsible chamber for urging said by-pass valve mechanism toward open position, means providing a passage between said inlet chamber and said expansible and collapsible chamber, means providing a passage between said expansible and collapsible chamber and said by-pass outlet chamber, a pilot valve mechanism associated with said last named passage for controlling the pressure in said expansible and collapsible chamber, said pilot valve mechanism including a valve member associated with the inlet of said last named passage and a thermostat operatively connected to said valve member and including a bulb for disposition relatively remote from said valve member.

CHARLES D. BRANSON.

REFERENCES CITED

The following references are of record in the file of this patent:

UNITED STATES PATENTS

| Number | Name | Date |
| --- | --- | --- |
| 1,814,530 | Spence | July 14, 1931 |
| 2,302,469 | Patterson | Nov. 17, 1942 |
| 2,355,043 | Adlam | Aug. 8, 1944 |
| 2,449,766 | Brown | Sept. 21, 1948 |
| 2,462,217 | Oaks | Feb. 22, 1949 |